US012802406B2

(12) United States Patent
Zhang et al.

(10) Patent No.: US 12,802,406 B2
(45) Date of Patent: Nov. 17, 2026

(54) WIRE DETECTION METHOD, DEVICE AND EQUIPMENT

(71) Applicant: AUTEL ROBOTICS CO., LTD., Shenzhen (CN)

(72) Inventors: Qiang Zhang, Shenzhen (CN); Deyu An, Shenzhen (CN); Ting Li, Shenzhen (CN); Jia Xu, Shenzhen (CN); Yong Deng, Shenzhen (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 219 days.

(21) Appl. No.: 18/679,038

(22) Filed: May 30, 2024

(65) Prior Publication Data

US 2024/0404249 A1 Dec. 5, 2024

(30) Foreign Application Priority Data

May 31, 2023 (CN) ......................... 202310633348.3

(51) Int. Cl.
*G06V 10/77* (2022.01)
*G06T 3/4046* (2024.01)
(Continued)

(52) U.S. Cl.
CPC ........ *G06V 10/7715* (2022.01); *G06T 3/4046* (2013.01); *G06T 5/50* (2013.01); *G06T 5/60* (2024.01); *G06V 10/20* (2022.01); *G06V 10/44* (2022.01); *G06V 10/776* (2022.01); *G06V 10/806* (2022.01); *G06V 10/82* (2022.01); *G06V 20/17* (2022.01); *G06V 20/176* (2022.01);
(Continued)

(58) Field of Classification Search
CPC .. G06V 10/7715; G06V 20/17; G06V 10/806; G06V 10/20; G06V 10/82; G06V 10/44; G06V 20/176; G06V 10/776; G06T 5/60; G06T 3/4046; G06T 5/50
IPC ................ G06V 10/7715,20/17, 10/806, 10/20, 10/82, 10/44, 20/176, 10/776; G06T 5/60, 3/4046, 5/50
See application file for complete search history.

(56) References Cited

FOREIGN PATENT DOCUMENTS

CN 114764778 A 7/2022

OTHER PUBLICATIONS

Yang, Lei, Junfeng Fan, Shuai Xu, En Li, and Yanhong Liu. "Vision-based power line segmentation with an attention fusion network." IEEE Sensors Journal 22, No. 8 (2022): 8196-8205. (Year: 2022).*

(Continued)

*Primary Examiner* — David Perlman
(74) *Attorney, Agent, or Firm* — Frank Gao, Esq.

(57) ABSTRACT

The present disclosure discloses an electric wire detecting method, apparatus, and device. The method includes acquiring an electric wire image, pre-processing the electric wire image, acquiring at least two electric wire feature maps with different resolutions according to the pre-processed electric wire image, inputting the at least two electric wire feature maps with different resolutions into a pre-set electric wire detecting network model, and outputting a detection result of the electric wire according to the electric wire detecting network model. The present disclosure detects electric wires based on electric wire feature maps with different resolutions and the pre-set electric wire detecting network model, so that electric wires can be accurately detected.

20 Claims, 6 Drawing Sheets

(51) Int. Cl.

| | |
|---|---|
| ***G06T 5/50*** | (2006.01) |
| ***G06T 5/60*** | (2024.01) |
| ***G06V 10/20*** | (2022.01) |
| ***G06V 10/44*** | (2022.01) |
| ***G06V 10/776*** | (2022.01) |
| ***G06V 10/80*** | (2022.01) |
| ***G06V 10/82*** | (2022.01) |
| ***G06V 20/10*** | (2022.01) |
| ***G06V 20/17*** | (2022.01) |

(52) U.S. Cl.

CPC ............... *G06T 2207/10032* (2013.01); *G06T 2207/20016* (2013.01); *G06T 2207/20084* (2013.01); *G06T 2207/30184* (2013.01)

(56) References Cited

OTHER PUBLICATIONS

Yang, Lei, Shuyi Kong, Jiahui Deng, Heng Li, and Yanhong Liu. "DRA-Net: A dual-branch residual attention network for pixelwise power line detection." IEEE Transactions on Instrumentation and Measurement 72 (2023): 1-13. (Year: 2023).*

Xu, Chang, Qingwu Li, Qingkai Zhou, Shan Zhang, Dabing Yu, and Yunpeng Ma. "Power line-guided automatic electric transmission line inspection system." IEEE Transactions on instrumentation and measurement 71 (2022): 1-18. (Year: 2022).*

The first office action of the CN priority application No. 202310633348.3 with English machine translation issued on Oct. 25, 2025.

* cited by examiner

WIRE DETECTION METHOD, DEVICE AND EQUIPMENT

CROSS REFERENCE TO RELATED DISCLOSURE

This application is filed based upon and claims priority to Chinese patent disclosure 202310633348.3, filed on May 31, 2023 and entitled "Electric wire detection method, Apparatus and Device", the entire disclosure of which is incorporated herein by reference for all purposes.

BACKGROUND

Related Art

Unmanned Aerial Vehicle (UAV) is widely used in daily life. When it flies autonomously in the air, especially in low-altitude power patrol tasks, accurate detection of the electric wire is an important guarantee to ensure flight safety of UAV. At present, electric wire detection is based on traditional Convolutional Neural Network (CNN) networks such as Fully Convolutional Network (FCN), Semantic Segmentation (SegNet) and DeepLab series networks. The current method has a small convolution receptive field, and the accuracy of segmentation detection is low, which results in that the electric wire cannot be accurately detected.

SUMMARY

The present disclosure relates to the field of computer technology, and in particular to an electric wire detecting method, apparatus and device.

The technical problem to be mainly solved by the implementations of the present disclosure is how to improve the accuracy of detecting electric wires.

According to a first aspect of the present disclosure is to provide an electric wire detecting method including acquiring an electric wire image; pre-processing the electric wire image, and acquiring at least two electric wire feature maps with different resolutions according to the pre-processed electric wire image; and inputting the at least two electric wire feature maps with different resolutions into a pre-set electric wire detecting network model, and outputting an electric wire detecting result according to the electric wire detecting network model.

According to a second aspect of the present disclosure is to provide an electric wire detecting apparatus including an electric wire image acquisition module configured to acquire an electric wire image; an image pre-processing module configured to pre-process the electric wire image, and acquire at least two electric wire feature maps with different resolutions according to the pre-processed electric wire image; and an electric wire detecting module configured to input the at least two electric wire feature maps with different resolutions into a pre-set electric wire detecting network model, and output an electric wire detecting result according to the electric wire detecting network model.

According to a third aspect of the present disclosure is to provide an electric wire detecting device including at least one processor; a memory in communication connection with the at least one processor; where the memory storing instructions executable by the at least one processor, and the instructions are executable by the at least one processor to enable the at least one processor to perform the method as described above.

BRIEF DESCRIPTION OF THE DRAWINGS

The one or more embodiments are illustrated by way of example in the accompanying drawings, which are not to be construed as limiting the embodiments, in which elements having the same reference numeral designations represent similar elements, and in which the figures are not to scale unless otherwise specified.

DETAILED DESCRIPTION

For the that the objectives, aspects, and advantages of the present disclosure may be more clearly understood, a more particular description of the invention, briefly summarized below, may be had by reference to the appended drawings and embodiments. It should be understood that the particular embodiments described herein are illustrative only and are not restrictive.

It should be noted that, if not in conflict, the various features of the embodiments of the present disclosure may be combined with of the present disclosure. In addition, although the division of functional modules is illustrated in a schematic diagram showing an apparatus and a logical order is illustrated in a flow diagram, in some cases, the steps illustrated or described may be performed in an order other than the division of the modules in the schematic diagram showing the apparatus or in the flowchart.

Unless defined otherwise, all technical and scientific terms used in the specification have the same meaning as commonly understood by a person skilled in the technical field to which this disclosure belongs. The terminology used in the description of the present disclosure is for the purpose of describing embodiments only and is not intended to be limiting of the disclosure.

Figure 1:
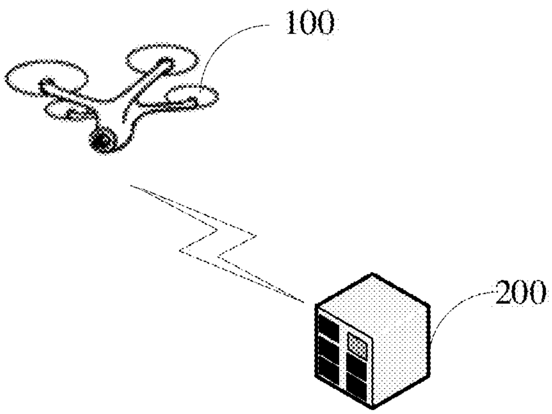
FIG. 1 is a schematic diagram showing one of disclosure environments of an electric wire detecting method according to an embodiment of the present disclosure.

FIG. 1 shows one of disclosure environments of an electric wire detecting method according to an embodiment of the present disclosure. As shown in FIG. 1, the disclosure environment includes an unmanned aerial vehicle 100 and an electric wire detecting device 200. Here, the unmanned aerial vehicle 100 is in communication connection with the electric wire detecting device 200 to perform information interaction.

Note that the electric wire detecting device 200 may be a separate device in communication connection to the unmanned aerial vehicle 100 or a device integrated in the unmanned aerial vehicle 100 and configured integrally with the unmanned aerial vehicle 100.

The unmanned aerial vehicle 100 may be a flight vehicle or other movable device driven by any type of power, including, but not limited to, a multi rotor UAV, such as a quad rotor UAV, a fixed-wing aircraft, a helicopter, and the like. In the present embodiment, the quad rotor UAV is described as an example.

The unmanned aerial vehicle 100 may have a corresponding volume or power to provide sufficient load capacity, flight speed, flight mileage, etc. as actually required.

Figure 2:
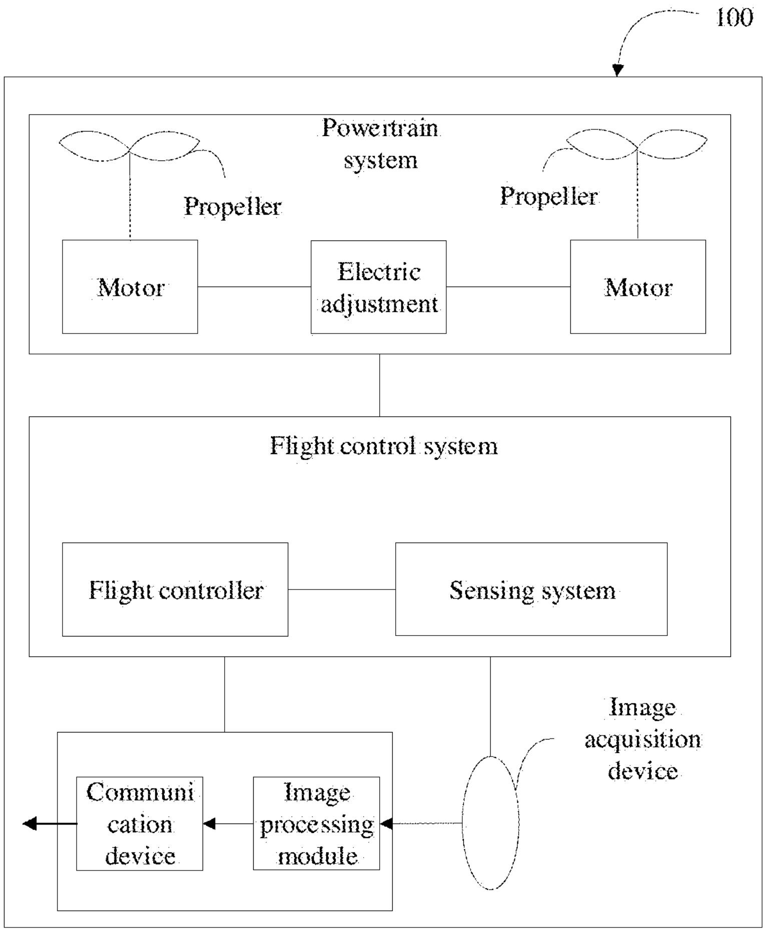
FIG. 2 is a block diagram showing an unmanned aerial vehicle according to an embodiment of the present disclosure.

For example, as shown in FIG. 2, the unmanned aerial vehicle 100 has at least one powertrain system for providing flight power and a flight control system for controlling the flight of the unmanned aerial vehicle 100. The flight control system is in communication connection with the powertrain system.

The powertrain system may include an electronic speed governor (referred to simply as an electric governor), one or more propellers, and one or more electric motors corresponding to the one or more propellers. A motor is connected between the electronic speed governor and the propeller, and the motor and the propeller are arranged on the arm of the corresponding unmanned aerial vehicle 100.

The electronic speed governor is configured to receive a drive signal generated by the flight control system and to provide a drive current to the motor based on the drive signal to control a rotational speed of the motor. The motor is used to drive the propeller to rotate, thereby powering the flight of the unmanned aerial vehicle 100, which enables the unmanned aerial vehicle 100 to achieve one or more degrees of freedom of movement.

In some embodiments, the unmanned aerial vehicle 100 may rotate about one or more rotation axes. For example, the rotation axis may include a horizontal roller, a translation axis, and a pitch axis. It will be appreciated that the motor may be a DC motor or an AC motor. Alternatively, the motor may be a brushless motor or a brushed motor.

The flight control system may include a flight controller and a sensing system. The sensing system is used to measure attitude information of the unmanned aerial vehicle 100, i.e., position information and state information of the unmanned aerial vehicle 100 in space, such as a three-dimensional position, a three-dimensional angle, a three-dimensional velocity, a three-dimensional acceleration, and a three-dimensional angular velocity. The sensing system may include, for example, at least one of a gyroscope, an electronic compass, an Inertial Measurement Unit (IMU), a vision sensor, a global navigation satellite system, and a barometer. For example, the global navigation satellite system may be the Global Positioning System (GPS).

The flight controller is used to control the flight of the unmanned aerial vehicle 100, for example, the flight of the unmanned aerial vehicle 100 may be controlled based on attitude information measured by the sensing system. It will be appreciated that the flight controller may control the flight of the unmanned aerial vehicle 100 according to pre-programmed instructions or may control the flight of the unmanned aerial vehicle 100 in response to one or more control instructions from other devices.

Moreover, one or more functional modules may be added to the unmanned aerial vehicle 100 to enable the unmanned aerial vehicle 100 to perform more functions, such as aerial mapping, etc.

For example, in some embodiments, the unmanned aerial vehicle 100 is provided with at least one electric wire detecting device 200 to detect an electric wire through the electric wire detecting device 200. In another embodiment, the unmanned aerial vehicle 100 is provided with at least one image acquisition device and a communication device for acquiring an image, where the image acquisition device and the communication device can be a component integrated in the unmanned aerial vehicle 100, respectively, an electric wire image is acquired via the image acquisition device, and the electric wire image is sent to the electric wire detecting device 200 via the communication device, so that the electric wire detecting device 200 pre-processes the electric wire image, and at least two electric wire feature maps with different resolutions are acquired according to the pre-processed electric wire image, at least two electric wire feature maps with different resolutions are input into a pre-set electric wire detecting network model, and an electric wire detecting result is output according to the electric wire detecting network model.

In some embodiments, the unmanned aerial vehicle 100 may also include memory space for storing the electric wire image to facilitate subsequent recall of the electric wire image when needed. The storage control may be a memory space internal or external to the unmanned aerial vehicle 100. For example, the unmanned aerial vehicle 100 is provided with an external SD card interface into which a memory device such as an SD card can be inserted to store the acquired electric wire image. Also, several frames of successive electric wire images form a video or video recording, and in some instances, the video or video recording formed from several frames of successive electric wire images may also be stored in a memory space internal or external to the unmanned aerial vehicle 100.

The electric wire detecting device 200 may be any type of user interactive device. The electric wire detecting device 200 may be equipped with one or more different user interactive devices to collect user instructions or to present or feedback information to the user, such as feedback on the detection results of the electric wire.

These interactive devices include, but are not limited to: keys, display screens, touch screens, speakers, and remote control levers. For example, the electric wire detecting device 200 may be equipped with a touch-sensitive display screen through which a user's touch instruction is received and through which information, such as an electric wire image, is presented to the user.

In some embodiments, the electric wire detecting device 200 may be an intelligent terminal device, such as a cell phone, tablet computer, personal computer, server, etc.

In some embodiments, the electric wire detecting device 200 may be an image processing module integrated into the unmanned aerial vehicle 100 as a component of the unmanned aerial vehicle 100. The image processing module may be a chip having computility, etc.

It is to be understood that the above-described naming of the various components of the unmanned aerial vehicle 100 is for identification purposes only and is not to be construed as limiting the embodiments of the present invention.

Moreover, the electric wire detecting method provided by the embodiments of the present disclosure can be further extended to other suitable disclosure environments, not limited to the disclosure environment shown in FIG. 1. The unmanned aerial vehicle 100 and the electric wire detecting device 200 in FIG. 1 are provided independently, and in practical disclosures, the disclosure environment may further include more unmanned aerial vehicles 100, and the electric wire detecting device 200 may perform electric wire detecting on electric wire images acquired by a plurality of unmanned aerial vehicles 100.

The electric wire detecting method for the present disclosure is explained below with reference to specific embodiments.

Figure 3:
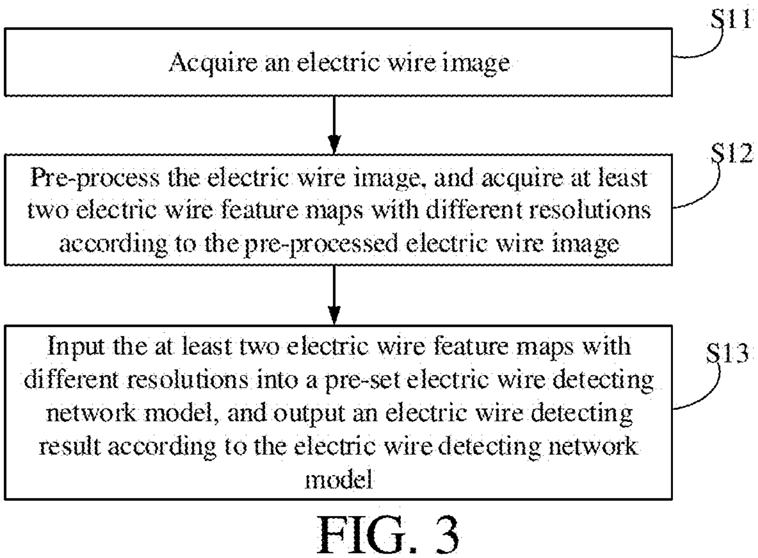
FIG. 3 is a flow chart of an electric wire detecting method according to an embodiment of the present disclosure.

Reference is made to FIG. 3, which is a flow diagram of a method for electric wire detecting according to an embodiment of the present disclosure. The method includes:

S11: an electric wire image is acquired.

The electric wire image refers to image data captured and collected by a camera, etc. carried on a carrier such as an unmanned aerial vehicle or an airplane. The electric wire image may include a transmission line, a transformer substation, an overhead line, etc. The electric wire image can be used for monitoring, detecting and maintaining a powertrain system, for example, by acquiring the electric wire image, obtaining electric wire information, detecting damage, corrosion, loosening, etc. of a transmission line according to the electric wire information, and detecting inclination, displacement, etc. of a telegraph pole. It can also be used for the navigation path planning of the unmanned aerial vehicle, such as identifying the electric wire in the electric wire image by acquiring the electric wire image, so that the unmanned aerial vehicle can avoid contacting the electric wire during the flight to ensure the safe flight of the unmanned aerial vehicle.

Through the analysis and processing of the electric wire image, the inspection and identification of the transmission line can be realized, the electric wire fault points can be quickly located, and the operation efficiency and reliability of the powertrain system can be improved. At the same time, the electric wire image can also be used in the planning and design of the powertrain system to help decision makers better develop the construction and maintenance of the powertrain system. Furthermore, in the field of unmanned aerial vehicles (UAVs), acquiring accurate electric wire images can improve the flight safety of UAVs.

In an embodiment of the present disclosure, the electric wires in the acquired image of the electric wires are mainly accurately detected to obtain the electric wire data within the area coverage.

S12: the electric wire image is pre-processed, and at least two electric wire feature maps with different resolutions are acquired according to the pre-processed electric wire image.

Pre-processing operations for electric wire images include, but are not limited to: image denoising, image correction, image stitching, object detection, image segmentation, etc. As the aerial image acquisition will be affected by shooting environment, weather and other factors, there may be some noise and interference in the image, image denoising can improve the quality and clarity of the image. There are some differences in aerial image acquisition, such as shooting angle and height, so it is necessary to correct the image so that the image is aligned in the horizontal plane for subsequent analysis and processing. There may be overlapping regions in the acquisition of aerial images, and multiple images can be stitched into a complete image through image stitching technology for subsequent analysis and processing. The electric wire image may contain a plurality of targets, such as telegraph poles, electric wires, etc. which can be extracted from the image for subsequent analysis and processing by target detection. For complex electric wire images, image segmentation is required to divide the image into multiple regions for better analysis and processing.

Figure 5:
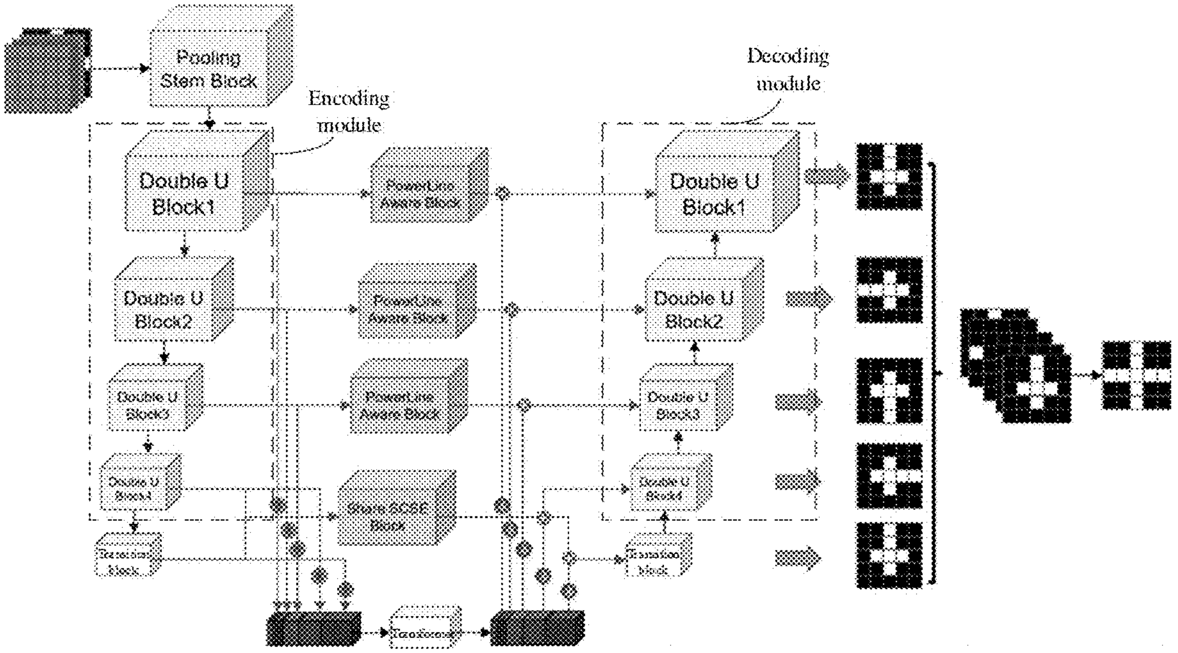
FIG. 5 is a schematic structural diagram showing an electric wire detecting network model according to an embodiment of the present disclosure.

At least two feature maps of electric wires with different resolutions can be extracted from the pre-processed electric wire image through a Pooling Stem Block module in a neural network; as shown in FIG. 5, the Pooling Stem Block is configured to extract feature information about input data, which includes a convolution layer, a Depth layer and a normalization layer; the input pre-processed electric wire image is processed through a convolution operation of the convolution layer to extract local features of the image, and then the feature map output by the convolution layer is down-sampled through the Depth layer; the size and number of parameters of the feature map are reduced while important feature information is retained. Finally, the feature map output by the Depth layer is normalized by the planned layer, so that the feature value is within a certain range, which is conducive to subsequent processing.

S13: the at least two electric wire feature maps with different resolutions are input into a pre-set electric wire detecting network model, and an electric wire detecting result is output according to the electric wire detecting network model.

After obtaining the at least two electric wire feature maps with different resolutions, the at least two electric wire feature maps with different resolutions may be input into a pre-set electric wire detecting network model, and an electric wire detecting result may be output through the electric wire detecting network model. The electric wire detecting network model refers to a model for accurately identifying a target electric wire from an electric wire image.

In an embodiment of the present disclosure, the electric wire detecting network model is a segmentation detection framework for electric wire detecting, and the electric wire detecting network model is composed of a Convolutional Neural Network (CNN) feature extraction module (i.e., Double_U Block, including an encoder and a decoder), an electric wire sensing module (i.e., Powerline Aware Block), a channel adjustment module (i.e., Transition block), a semantic information extraction module (i.e., Share scSE Block) and a Transformer block. The feature extraction module can include a plurality of modules, i.e., at least two electric wire feature maps with different resolutions are acquired respectively through a plurality of Token encoders, the at least two electric wire feature maps with different resolutions are processed through an encoder and a channel adjustment module to obtain a vector representation of the electric wire feature map, and the vector representation being input into a Transformer block for processing, and being able to perform process abstraction and feature extraction on the input vector to obtain a first feature matrix or a first feature vector. In addition, at least two electric wire feature maps with different resolutions are input into an electric wire sensing module and a semantic information extraction module to perform image enhancement processing, and the image data after enhancement processing is input into a Transformer block for processing to obtain a second feature matrix or a second feature vector. Finally, the detection results corresponding to the at least two electric wire feature maps with different resolutions are combined, i.e., the first feature vector and the second feature vector are performed feature fusion processing to obtain the electric wire image detection results corresponding to the at least two electric wire feature maps with different resolutions. The decoder of the feature extraction module can restore the fused feature map to the resolution of the original image, so that the electric wire detecting result in the original resolution can be obtained.

In conjunction with the above-mentioned pre-set electric wire detecting network model, how to perform electric wire detection on an electric wire image according to the electric wire detecting network model will be described in detail below.

Figure 4:
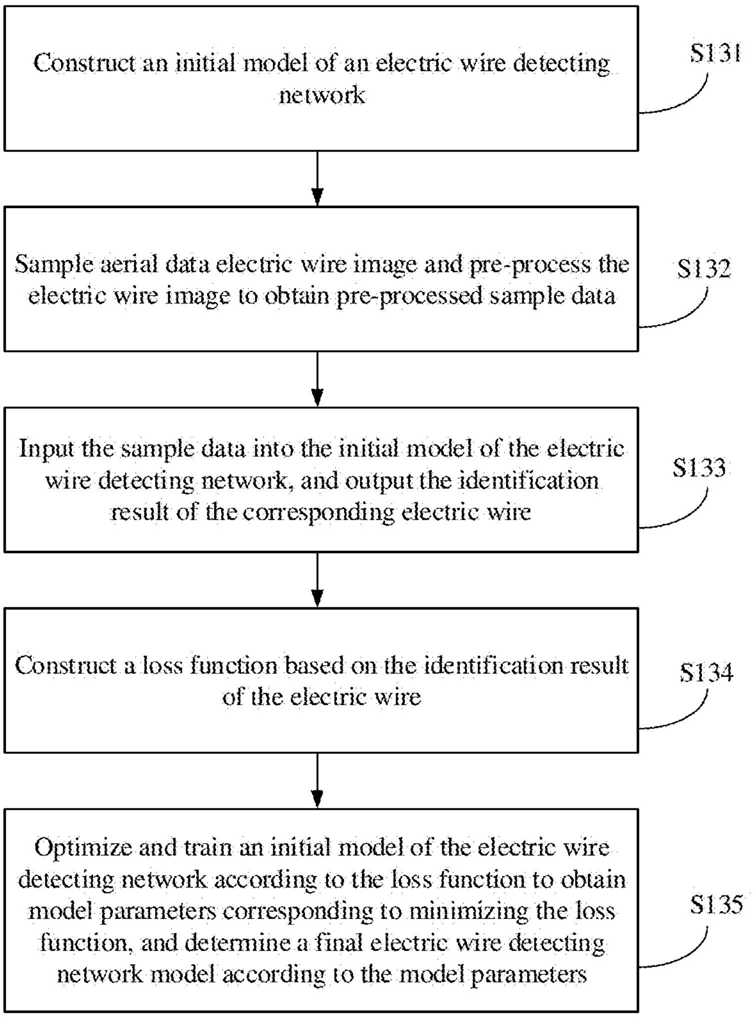
FIG. 4 is a flow diagram of a method for acquiring the electric wire detecting network model according to an embodiment of the present disclosure.

First, the electric wire detecting network model is acquired. Specifically, reference is made to FIG. 4, the acquiring the electric wire detecting network model includes:

S131: an initial model of an electric wire detecting network is constructed.

The electric wire detecting network initial model refers to a network architecture when the electric wire detecting network model does not determine specific parameters. The process of acquiring the electric wire detecting network model in the embodiments of the present disclosure is a process of determining the parameters of the electric wire detecting network model, and the final model parameters are obtained by optimizing the training model parameters mainly through the constructed loss function, i.e., the final electric wire detecting network model is determined.

In an embodiment of the present disclosure, the overall network architecture design of the initial model of the electric wire detecting network follows a U-shaped neural network structure, such as a U-Net structure, which is a convolutional neural network structure for image segmentation and mainly includes two parts: an encoder and a decoder. The encoder is composed of a convolution layer, a Depth layer and an activation function, and is used for extracting image features and compressing same into a low-resolution feature map; the decoder is composed of a deconvolution layer and a skip connection, which is used to restore the low-resolution feature map to the resolution size of the original image, and fuse the high-level features in the decoder and the low-level features in the encoder through the skip connection to improve the segmentation performance.

In an embodiment of the present disclosure, the constructing an initial model of an electric wire detecting network includes:

- designing a plurality of feature extraction modules based on a U-shaped neural network, where the plurality of feature extraction modules are arranged as a symmetric encoder and a decoder, and the encoder is used for processing at least two electric wire feature maps with different resolutions;
- a Transformer block is inserted based on the U-shaped neural network; the output results of the encoder are all input into the Transformer block; the Transformer block is used for performing multi-level abstraction and feature extraction based on the at least two electric wire feature maps with different resolutions to obtain a first feature vector corresponding to each of the electric wire feature maps; and the first feature vector performs feature fusion processing via the decoder to obtain at least two different resolution electric wire image detection results.

Specifically, reference is made to FIG. 5, which is a schematic structural diagram showing an electric wire detecting network model according to an embodiment of the present disclosure; As shown in FIG. 5, a plurality of feature extraction encoders (i.e., Double_U Block) are designed based on a U-shaped neural network, and the plurality of feature extraction encoders are set as symmetric encoders and decoders; in FIG. 5, the left Double_U Block1/2/3/4 is an encoder (i.e., an encoding module), and the right Double_U Block1/2/3/4 is a decoder (i.e., a decoding module). The number of encoders remains corresponding to the number of decoders, may be one by one as shown in FIG. 5, i.e., one encoder corresponds to one decoder. The encoder is used for processing the electric wire feature maps with different resolutions, and obtaining a characterization vector corresponding to the electric wire feature maps with different resolutions, and the characterization vector is input into a Transformer block (i.e., transformer Block in FIG. 5). The decoder is used for fusing the output results of the multiple feature extraction encoders and the output results of the Transformer block to obtain detection results of an electric wire image with different resolutions, and the features can be converted back to the size and resolution of the original image by the decoder, for example, the image size and resolution of the left Double_U Block1 and the right Double_U Block1 in FIG. 5 are both the same.

Double_U Block is a convolutional neural network module for image segmentation task, which is formed by connecting two U-Net-like networks in series, where each U-Net module is composed of an encoder and a decoder. The encoder is used to extract features in the image, while the decoder restores these features to the size and resolution of the original image. In Double_U Block, the two U-Net modules are implemented by sharing an encoder and a decoder, thereby reducing the number of parameters in the model, and improving the operational efficiency of the model.

Figure 6:
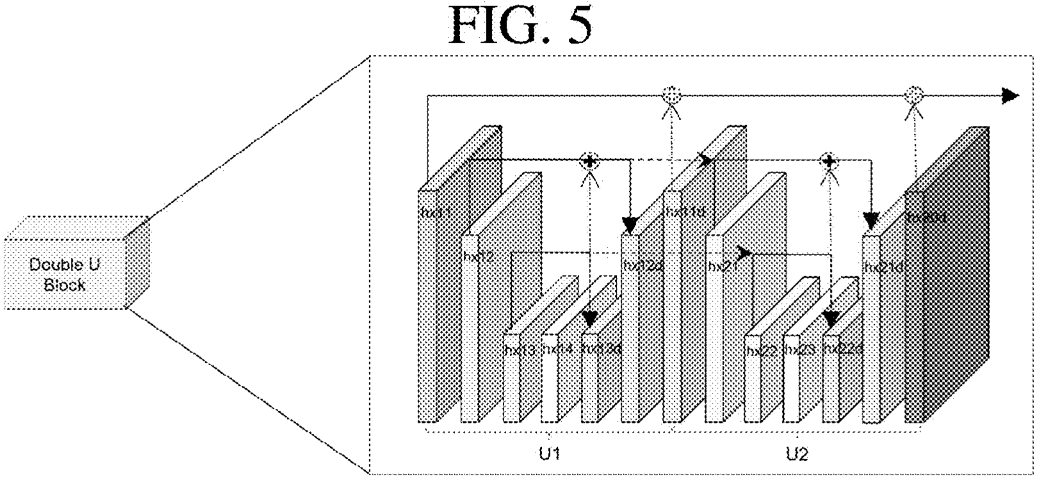
FIG. 6 is a schematic structural diagram showing a Double_U Block according to an embodiment of the present disclosure.

As shown in FIG. 6, it is a schematic structural diagram showing a Double_U Block, where two U-shaped networks are respectively referred to as U1 and U2, and the Double_U Block has six times of down-sampling and six times of up-sampling, respectively located in the two U-shaped networks U1 and U2, please refer to FIG. 6, hx11 to hx12, hx12 to hx13, and hx13 to hx14 are three times of down-sampling corresponding to U1, hx14 to hx13*d*, hx13*d* to hx12*d*, and hx12*d* to hx11*d* are three times of up-sampling corresponding to U1; U1 obtains a feature map hx11*d* after three times of down-sampling and three times of up-sampling; the feature map corresponding to hx11*d* serves as an input of U2; and U2 outputs the feature map hx20*d* after three times of down-sampling and three times of up-sampling, where hx11*d* to hx21, hx21 to hx22, and hx22 to hx23 are three times of down-sampling corresponding to U2, hx23 to hx22*d*, hx22*d* to hx21*d*, and hx21*d* to hx20*d* are three times of up-sampling corresponding to U2. Finally, the obtained hx11*d*, hx20*d* and the initial hx11 are fused, and the fused feature is taken as the output feature of Double_U Block. The hx11, hx12, hx13, hx14, hx13*d*, hx12*d*, hx11*d*, hx21, hx22, hx23, hx22*d*, hx21*d* and hx20*d* in FIG. 6 all belong to corresponding feature maps, and the two U-shaped networks respectively can reduce the resolution of the feature map by three times of down-sampling and at the same time increase the number of channels of the feature map, so that the global information in the input image can be extracted and the size of the feature map can be reduced, thus reducing the calculation amount, and the process can be realized by using a Depth layer or a convolution layer. The two U-shaped networks can restore the resolution of the feature map to the original size while reducing the number of channels by respectively up-sampling three times, which can be implemented using a deconvolution layer or an up-sampling layer, which can restore the information lost in the down-sampling process. Through down-sampling and up-sampling operations, U-Net can extract global and local feature information from the input image, and use this information in the image segmentation task.

Two down-sampling operations in U1 can enable the network to acquire a larger receptive field (in a convolutional neural network, the receptive field refers to the size of a region where a neuron receives input information, which can be regarded as the local sensitivity of the neuron to the input information), and by enlarging the receptive field, the model can better capture the global information of an image or feature. In addition, the feature maps of various resolutions in U1 and U2 networks are connected through short_cut, so that the information which has not been mined in U1 can be mined twice in U2, increasing the network information mining capacity. For example, U-Net performs feature extraction and down-sampling in the encoder portion using a convolution layer and a Depth layer alternately. For U1, assuming the input image size is 256×256 pixels, the first down-sampling of U1 can reduce the image size by half to 128×128 pixels. In this process, the convolution layer with step size of 2 can be used to reduce the image size by half, and then the Depth layer is used for further down-sampling. The second down-sampling can reduce the image size by half to 64×64 pixels, and the convolution layer with step size of 2 and the Depth layer can also be used. In the decoder portion of U-Net, a deconvolution layer or an up-sampling layer is often used for feature mapping restoration. For U1, assuming that two down-samplings have been completed, it is now necessary to restore the feature mapping to the original size of 256×256 pixels; the first up-sampling can use the up-sampling layer to increase the size of the feature image by 2 times, and restore same from 64×64 pixels to 128×128 pixels; then a convolution layer with a step size of 1 is used to process the feature to further increase the resolution of the image; and the second up-sampling can use the same method to restore the image to the original size, i.e., the feature image layer is used to increase the feature image size by a factor of 2, from 128×128 pixels to 256×256 pixels, and then the convolution layer is used to output the final segmentation result. However, the operation of U2 is similar to that of U1, feature extraction is performed through down-sampling and up-sampling with respect to an input image, thereby increasing the network information mining capability.

A Shortcut connection, i.e., a skip connection, refers to connecting the output of some layers in a network directly to the input of subsequent layers so that information can be passed across multiple hierarchies. In the U-Net model, Shortcut connection refers to connecting the outputs of the respective hierarchies between the encoder and decoder. The purpose of this connection is to pass the high-resolution feature map directly into the decoder, thereby helping the decoder to better reconstruct the original image. In Double_U Block, since it contains two U-Net modules, the outputs of the corresponding hierarchy between them also need to be connected to maintain the integrity and continuity of the information.

The output of each Double_U Block is a residual joint output, which integrates the features of a shallow layer and a deep layer, and is more conducive to constructing a deep-level network, and the formula is as follows:

$$\mathrm{out}_{DUB_i} = hx11 + hx11d + hx20d.$$

It should be noted that FIG. 6 shows that a Double_U Block is composed of two U-Net modules, and in other embodiments, fewer or more U-Net modules may be included, and the structure of each U-Net module may include fewer or more times of down-sampling and up-sampling, without being limited to three times of down-sampling and three times of up-sampling for the above-mentioned one U-Net module.

Alternatively, each of Double U Block 1, Double U Block 2, Double U Block 3, and Double U Block 4 in FIG. 5 can be the structure of Double U Block in FIG. 6 respectively, i.e., each includes two U-shaped networks including U1 and U2 respectively, and can perform six times of down-sampling and six times of up-sampling; however, in practical disclosures, the Double U Block in FIG. 5 can also exist in other structural forms without being limited to the structure shown in FIG. 6.

In FIG. 5, four Double_U Blocks constitute a part of feature extraction of the electric wire detecting network model, which can realize multi-level resolution and multiple feature mining. The following table shows the resolution for each Double_U Block block group:

| Double_U Block | Double_U Block1 | Double_U Block2 | Double_U Block3 | Double_U Block4 |
|---|---|---|---|---|
| Input resolution | 512 × 512 | 256 × 256 | 128 × 128 | 64 × 64 |
| Intra-block resolution | 512 × 512<br>256 × 256<br>128 × 128 | 256 × 256<br>128 × 128<br>64 × 64 | 128 × 128<br>64 × 64<br>32 × 32 | 64 × 64<br>32 × 32<br>16 × 16 |
| Output resolution | 512 × 512 | 256 × 256 | 128 × 128 | 64 × 64 |

It should be noted that four Double_U Blocks are shown in FIG. 5, and in practical disclosures, the number of Double_U Blocks can be freely adjusted according to needs, for example, increasing an image with an input resolution of 1024×1024, thereby increasing one more Double_U Block.

After performing a pre-set level down-sampling operation and an up-sampling operation on at least two electric wire feature maps with different resolutions by the above-mentioned encoder, a characterization vector corresponding to each of the electric wire feature maps can be obtained, and the characterization vector is used for representing the feature and semantic information about each resolution image. Feature vectors corresponding to the electric wire feature maps with different resolutions are respectively input into the Transformer block, and the characterization vectors corresponding to the electric wire feature maps with different resolutions are performed multi-level abstraction and feature extraction via the Transformer block to obtain a first feature vector corresponding to each of the electric wire feature maps, where the first feature vector can be fused with the features output by the above-mentioned four Double_U Blocks (encoders), and electric wire image detection results maintaining the original size and resolution are output on the four Double_U Blocks (decoders).

The Transformer block is a neural network model based on attention mechanism, which is used for multi-level abstraction and feature extraction of an input sequence. In particular, the Transformer performs sequence encoding through a plurality of self-attention layers, and each self-attention layer performs self-attention calculation on the input sequence to perform weighted representation and abstraction on different parts of the input sequence. In each self-attention layer, each position of the input sequence is associated and computed with other positions to achieve multi-level feature extraction and abstraction. In the self-attention calculation, the representation vectors of each position are weighted and aggregated according to the representation vectors of other positions, to obtain a more global representation vector. Through the superposition of multiple self-attention layers, the Transformer block can perform multi-level abstraction and feature extraction on the input sequence, to obtain a more advanced and abstract feature representation. One such Transformer block typically includes a multi-head self-attention layer, residual connection, layer normalization, feedforward network layer, residual connection, and layer normalization. The design of Transformer block eliminates the timing dependence and local receptive field constraints of traditional cyclic neural networks and convolutional neural networks, so that the model has better parallelization capability and longer input sequence processing capability. It should be noted that the number of Transformer blocks can be adjusted according to practical disclosures, and is not limited to FIG. 5.

In some embodiments, the constructing an initial model of an electric wire detecting network further includes: a channel adjustment module is inserted based on the U-shaped neural network. As shown in FIG. 5, the channel adjustment module is Transition block. The channel adjustment module is symmetrically designed based on the U-shaped neural network for performing size adjustment and channel number adjustment on the feature map processed by the encoder and the decoder. The Transition block is mainly used to adjust the size of the feature map and the number of channels to connect and transfer between different layers. In some depth neural networks, the size of the feature map and the number of channels change with the increase of the number of network layers, and the Transition block is introduced to enable the smooth transfer of features among different layers.

In some embodiments, the constructing an initial model of an electric wire detecting network further includes: an electric wire sensing module and a semantic information extraction module are inserted based on the U-shaped neural network. As shown in FIG. 5, the electric wire sensing module is PowerLine Aware Block, and the semantic information extraction module is Share SCSE Block. The number of the electric wire sensing module and the semantic information extraction module keeps corresponding to the number of the encoders and the number of the decoders, for example, in FIG. 5, three PowerLine Aware Block respectively correspond to Double_U Block1/2/3, and one Share SCSE Block corresponds to Double_U Block4. The electric wire sensing module is used for performing image enhancement processing on the at least two electric wire feature maps with different resolutions to obtain a second feature vector corresponding to each of the electric wire feature maps. The semantic information extraction module is configured to extract semantic information from low-resolution electric wire feature maps of the at least two electric wire feature maps with different resolutions through a semantic information extraction module to obtain a second feature vector corresponding to the low-resolution electric wire feature map. As shown in FIG. 5, three PowerLine Aware Blocks and one Share SCSE Block are included, and the three PowerLine Aware Blocks respectively acquire the electric wire feature maps with different resolutions processed by Double_U Block1/2/3, and respectively perform image enhancement processing on the electric wire feature maps with different resolutions. The Share SCSE Block takes the lowest resolution electric wire feature map from the Double_U Block4 and performs image enhancement processing on the lowest resolution electric wire feature map. Through PowerLine Aware Block and Share SCSE Block, a second feature vector corresponding to an electric wire feature map with different resolutions can be obtained, and the second feature vector can be respectively input into four Double_U Blocks constituting a decoder.

Figure 7:
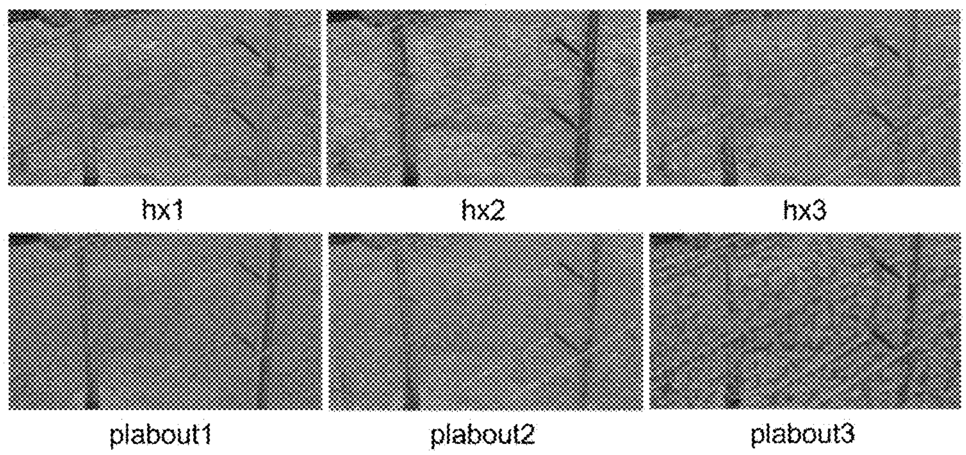
FIG. 7 is a characteristic thermal map of various stages of a shallow layer of an electric wire image network according to an embodiment of the present disclosure.

In an embodiment of the present disclosure, the PowerLine Aware Block is designed for elongated electric wire features. In the shallow network, the detailed information is very rich, and the specific extraction of electric wire features can be performed through PowerLine Aware Block, and after feature fusion, the sensing ability of the subsequent network to the electric wire is further improved; as shown in FIG. 7, it is a feature thermograph of various stages in the shallow network of the electric wire image, where the first lines hx1, hx2 and hx3 are feature maps which are not enhanced by the electric wire features, and the second lines plabout1, plabout2, and plabout3 are feature maps for performing feature enhancement of an electric wire via PowerLine Aware Block, and the feature map enhanced via PowerLine Aware Block can better suppress the activation degree of a background and highlight the feature of the electric wire, to facilitate the detection of the electric wire.

Figure 8:
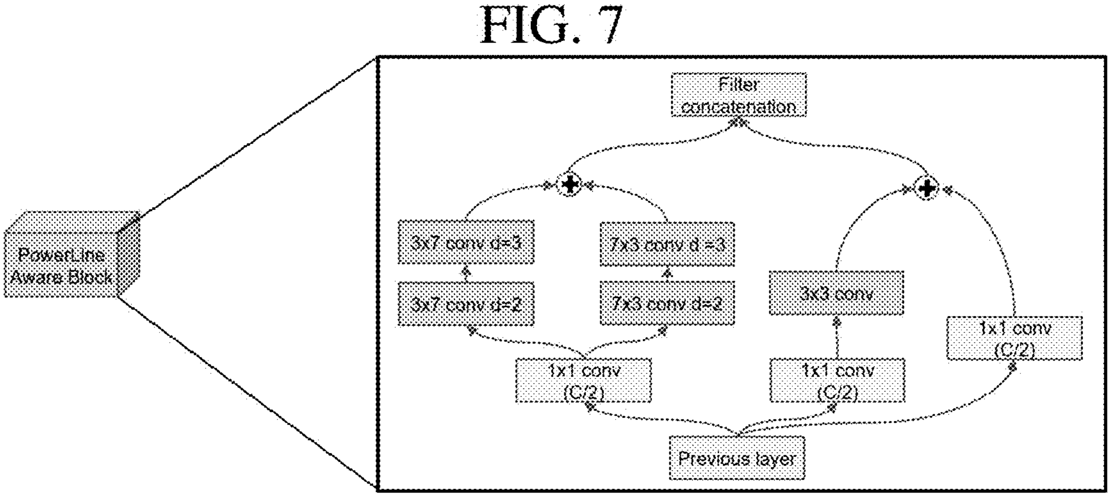
FIG. 8 is a schematic structural diagram showing a PowerLine Aware Block according to an embodiment of the present disclosure.

The structure of PowerLine Aware Block (i.e., PLAB) can be used to capture the elongated electric wire features through two-way asymmetric dilated convolution as shown in FIG. 8. The design of two parallel asymmetric dilated convolutions can effectively extract features in vertical and horizontal directions, respectively, and use parallel ordinary convolutions to complement the dilated features. The output of the whole module follows the following formula:

$$PLAB_{out} = concat(conv_{3\times 7,d=2,3,n=2}(conv_{1\times 1}(x)) + conv_{7\times 3,d=2,3,n=2}(conv_{1\times 1}(x)),\ (conv_{3\times 3,d=1,n=1}(conv_{1\times 1}(x) + conv_{1\times 1}(x))));$$

where d is dilation of the dilated convolution and n is the number of convolutions.

Figure 9:
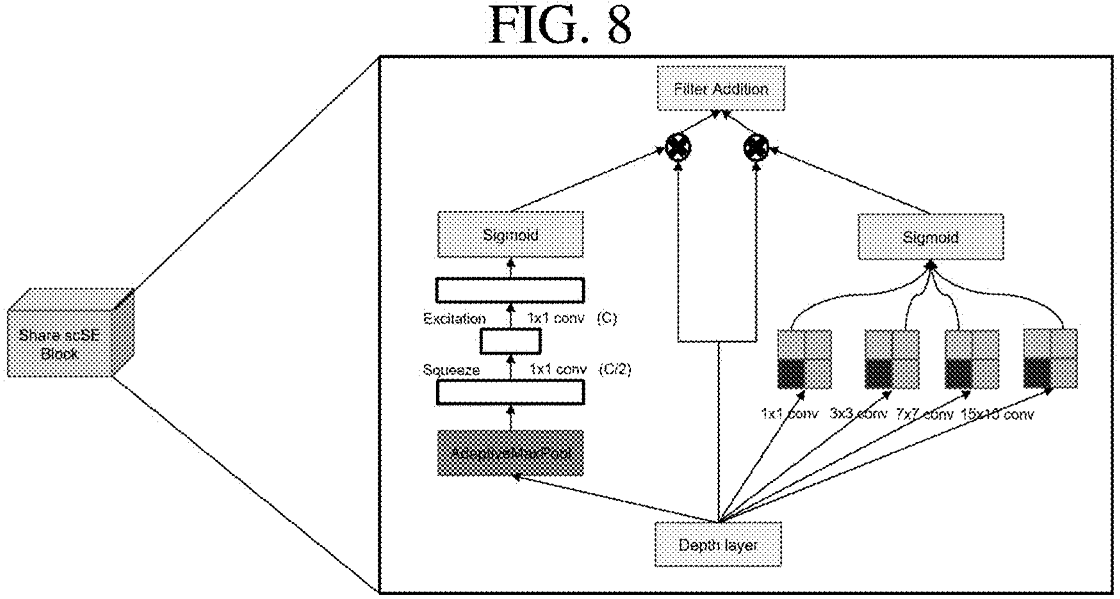
FIG. 9 is a schematic structural diagram showing a Share SCSE Block according to an embodiment of the present disclosure.

Spatial and Channel Squeeze and Excitation share SCSE (Share SCSE) Block is an improved module of an embodiment of the present disclosure for performing enhanced mining on electric wire features in a deep network. For example, as shown in FIG. 9, which is a schematic structural diagram showing Share scSE Block according to an embodiment of the present disclosure. It will be appreciated that Max Pooling and Average Pooling are two common pooling approaches in convolutional neural networks, both down-sampling the image after the convolution operation. The effect of maximum pooling is to extract the most significant features from the input data, divide the input area of a given size into several sub-areas, and then select a maximum value from each sub-area as the output, which effectively reduces the image size and preserves important features for subsequent classification or other tasks. In image classification tasks, for example, maximum pooling may make the model more robust and insensitive to changes in the position of the target object in the image. In an embodiment of the present disclosure, the Spatial and Channel Squeeze and Excitation module is modified to replace the average pooling with the maximum pooling in the Channel SE branch, so that the portion of the electric wire with the highest degree of activation in the feature map can be correlated with the importance weight of the channel dimension. Specifically, as shown in FIG. 9, the main steps include: for a specific electric wire portion, a corresponding feature map thereof is obtained via a CNN model, where the feature map includes several channels; the output of each channel is converted into a numerical value through a global average Depth layer; according to the weight output by the classifier, the numerical value of each channel is weighted; for each weighted channel, the spatial average pooling is performed again, and the importance weight of the channel dimension of the whole feature map is obtained. Thus, in an embodiment of the present disclosure, each channel is weighted according to the importance weights of all the channels in the feature map, and then the weighted average of each channel in the spatial dimension is averaged as the importance weight of the whole feature map in the channel dimension, to realize the correlation between the electric wire portion with the highest activation degree in the feature map and the importance weight of the channel dimension.

In the present embodiment, by extending the original module in the Spacial SE (Squeeze-and-Excitation) branch, it is considered that the original Spacial SE module does not have a real spatial companding, and by using a multi-resolution convolution kernel (such as 1×1conv, 3×3conv, 7×7conv and 15×15conv in FIG. 9), performing feature extraction under different visual fields and fusing different receptive field features to achieve a real spatial companding further improve the performance of the Spacial SE branch. Spacial SE is an deep learning network module for image classification, which can adaptively adjust the weight of each feature map channel to improve the performance of the model. The Spatial SE module consists of two parts: squeeze and excitation. The squeeze operation reduces the number of channels by global average pooling to better understand the interaction of features, and then the excitation operation learns the importance weight of each channel by using two full connection layers and applies it to the original features. Such adaptive channel weighting mechanism can effectively improve the representation ability of the model and achieve good performance in many image classification tasks.

In some embodiments, the Transformer block is used for performing multi-level abstraction and feature extraction based on the at least two electric wire feature maps with different resolutions, to obtain a first feature vector corresponding to each of the electric wire feature maps, the first feature vector and a second feature vector generated by the above-mentioned PowerLine Aware Block and Share SCSE Block, and feature fusion processing is performed via the decoder to obtain different resolution electric wire image detection results.

In an embodiment of the present disclosure, when the above-mentioned initial model of an electric wire detecting network is constructed, firstly the sampled image data (image data containing an electric wire and image data not containing an electric wire) is sent to Pooling Stem Block for processing; since Pooling Stem Block can process high-resolution data, an ultra-high-resolution image captured by an unmanned aerial vehicle can be sent to Pooling Stem Block for processing, and the high-resolution image can still maintain a high identification accuracy after being subjected to subsequent multiple resolution degradations (such as the original ½, ¼, ⅛ and 1/16). Resulting images of different resolutions are sent to the corresponding Double U Block respectively, and optionally, the Double U Block can further reduce the resolution. Transition Block belongs to the category of deep neural networks for processing images with smaller resolution. It can be known that Transition Block and Share SCSE Block belong to deep neural networks, and Double U Block and PowerLine Aware Block belong to shallow neural networks. Vector representation of image data is obtained after processing image data of different resolutions in different Double U Blocks and Transition Blocks. The data representation of the image data is then input to the Transformer Block for processing, and the Transformer Block can perform process abstraction and feature extraction on the input vector, and specifically, a corresponding feature matrix or feature vector can be obtained. On the other hand, images with different resolutions are processed by PowerLine Aware Block and Share SCSE Block for image enhancement processing. Finally, the feature extraction output by Transformer Block and the features output by PowerLine Aware Block and Share SCSE Block are fused to obtain the electric wire detecting results of the images under different resolutions, and the electric wire detecting results of the images under different resolutions are combined to obtain the electric wire detecting results of the images under the original resolutions.

The electric wire detecting network initial model can be constructed through the above steps, and then trained to determine a final electric wire detecting network model.

S132: an electric wire image is sampled and the electric wire image is pre-processed to obtain pre-processed sample data.

The pre-processing of the electric wire image mainly includes image denoising, image enhancement, image binarization and other operations, and specific reference can be made to related technologies. Through the preprocessing operation, a large amount of sample data is obtained, and the sample data is used for training the initial model of the electric wire detecting network described below.

S133: the sample data is input into the initial model of the electric wire detecting network, and the identification result of the corresponding electric wire is output.

According to the above-mentioned constructed initial model of the electric wire detecting network and the input sample data, it is possible to output a identification result of the obtained electric wire, the identification result including information such as an image of the electric wire, the position of the electric wire, etc.

S134: a loss function is constructed based on the identification result of the electric wire.

In an embodiment of the present disclosure, for the difficulty of the electric wire detecting task: the data sample is extremely unbalanced, and the proportion of foreground pixels is much smaller than that of background pixels; at the same time, the nature of being long and thin of the electric wire is susceptible to a large amount of redundant background information. Based on this, a joint multi-weight loss function is proposed. Specifically, the formula for the loss function is as follows:

$$L = \alpha * CE_{weight=1:5} + \beta * phiLoss + \gamma * DiceLoss_{weight=1:5};$$

where L represents the loss function, α, β and γ are weight coefficients, CE refers to a cross entropy loss function, phiLoss refers to a loss function used for a target detection task, DiceLoss refers to a loss function used for an image segmentation task, and weight=1:5 refers to a weight ratio. For a detailed introduction of the upper cross entropy loss function, the loss function for the target detection task and the loss function for the image segmentation task, reference can be made to the description of the related art.

S135: an initial model of the electric wire detecting network is optimized to train according to the loss function to obtain model parameters corresponding to minimizing the loss function, and a final electric wire detecting network model is determined according to the model parameters.

The optimizing to train the electric wire detecting network initial model according to the loss function to obtain model parameters corresponding to minimizing the loss function may include:

initializing model parameters: the model parameters are initialized to some random value, typically using a uniform distribution or a normal distribution. Forward propagation: the output of the model is computed by forward propagation using the initialized model parameters. Calculating the loss function: the output of the model is compared with a true value and the value of the loss function is calculated. Back propagation: a back-propagation algorithm is used to calculate the gradient of the loss function to the model parameters. Parameter update: according to the gradient descent method, model parameters are updated using an optimizer to minimize the loss function. The forward propagation, loss calculation, back propagation and parameter updating are repeated until a predetermined number of training rounds is reached or the loss function converges.

Thus, the obtained model parameters serve as parameters of the initial model of the electric wire detecting network, and the initial model of the electric wire detecting network including the parameters is the final electric wire detecting network model.

Alternatively, a test set may also be used to evaluate the performance of the trained model, typically using metrics such as accuracy, recall, F1 value, etc.

The pre-set electric wire detecting network model can be obtained by the above-mentioned method, and then the detection result of the electric wire is output according to the electric wire detecting network model.

Figure 10:
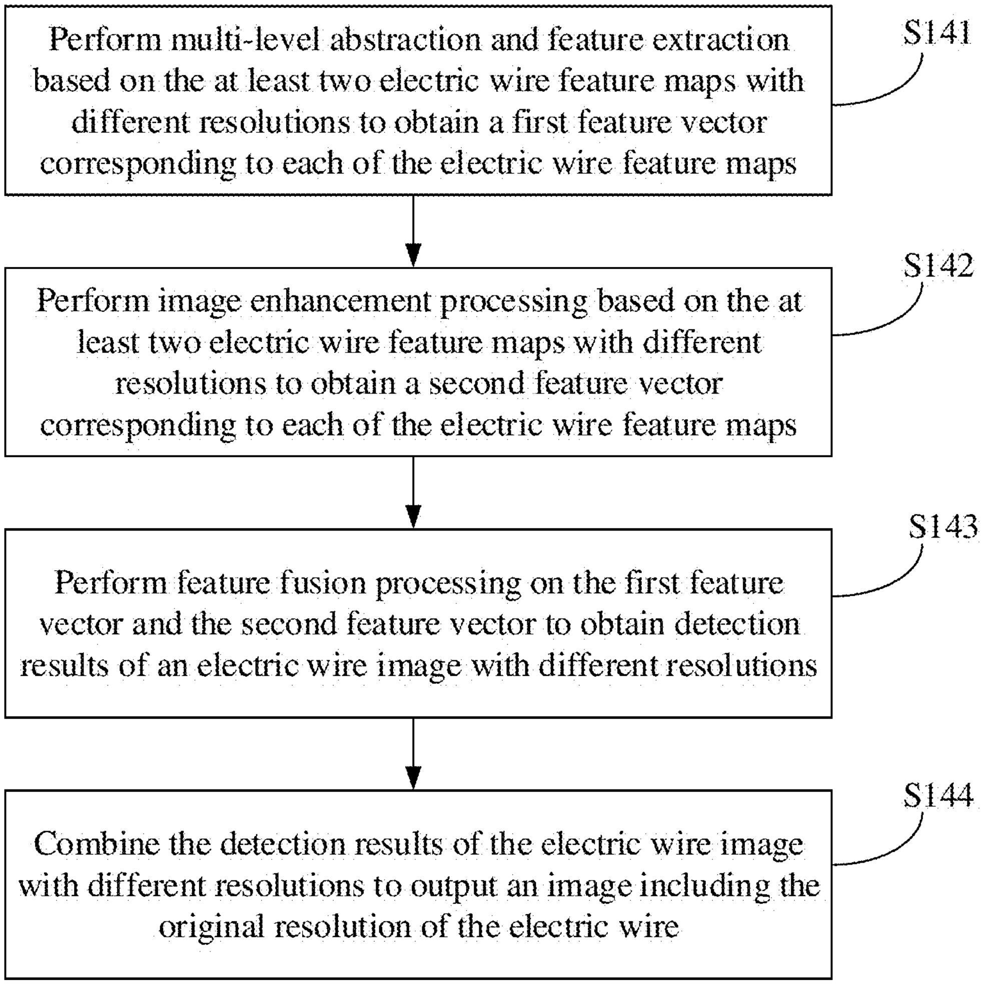
FIG. 10 is a flow diagram of a method for outputting a detection result of an electric wire according to an electric wire detecting network model according to an embodiment of the present disclosure.

Reference is made to FIG. 10, the output electric wire detecting result according to the electric wire detecting network model includes:

S141: multi-level abstraction and feature extraction are performed based on the at least two electric wire feature maps with different resolutions to obtain a first feature vector corresponding to each of the electric wire feature maps The at least two electric wire feature maps with different resolutions are performed by a feature extraction module, a down-sampling operation and an up-sampling operation at a pre-set level respectively to obtain a characterization vector corresponding to each of the electric wire feature maps; and the characterization vectors corresponding to the at least two electric wire feature maps with different resolutions are performed multi-level abstraction and feature extraction via a Transformer block to obtain a first feature vector corresponding to each of the electric wire feature maps.

S142: image enhancement processing is performed based on the at least two electric wire feature maps with different resolutions to obtain a second feature vector corresponding to each of the electric wire feature maps. The at least two electric wire feature maps with different resolutions are performed image enhancement processing via at least two electric wire sensing modules to obtain a second feature vector corresponding to the at least two electric wire feature maps with different resolutions; and semantic information is extracted from low-resolution electric wire feature maps of the at least two electric wire feature maps with different resolutions through a semantic information extraction module to obtain a second feature vector corresponding to the low-resolution electric wire feature map.

The performing image enhancement processing on the at least two electric wire feature maps with different resolutions via at least two electric wire sensing modules specifically includes performing electric wire feature extraction on the electric wire feature map through two paths of asymmetric dilated convolutions of the electric wire sensing modules, where the at least two electric wire sensing modules each respectively include the two paths of asymmetric dilated convolutions, and the number of the at least two electric wire sensing modules keeps corresponding to the number of classes of the resolution, which may be a one-to-one correspondence.

S143: the first feature vector and the second feature vector are performed feature fusion processing to obtain detection results of an electric wire image with different resolutions.

S144: the detection results of the electric wire image are combined with different resolutions to output an image including the original resolution of the electric wire.

The detailed process of the above steps S141 to S144 can be described with reference to the above embodiment.

Alternatively, the inputting the at least two electric wire feature maps with different resolutions into a pre-set electric wire detecting network model, and outputting an electric wire detecting result according to the electric wire detecting network model include performing multi-level abstraction and feature extraction based on the at least two electric wire feature maps with different resolutions to obtain a first feature vector corresponding to each of the electric wire feature maps; performing image enhancement processing based on the at least two electric wire feature maps with different resolutions to obtain a second feature vector corresponding to each of the electric wire feature maps; performing feature fusion processing on the first feature vector and the second feature vector to obtain detection results of an electric wire image with different resolutions; and combining the detection results of the electric wire image with different resolutions to output an image including the original resolution of the electric wire.

Alternatively, the acquiring at least two electric wire feature maps with different resolutions according to the pre-processed electric wire image includes: extracting local features of the pre-processed electric wire image to obtain a local feature map; down-sampling based on the local feature map; and normalizing the down-sampled local feature map, and outputting a plurality of electric wire feature maps with different resolutions.

Alternatively, the performing multi-level abstraction and feature extraction based on the at least two electric wire feature maps with different resolutions to obtain a first feature vector corresponding to each of the electric wire feature maps includes: performing, by a feature extraction module, a down-sampling operation and an up-sampling operation on the at least two electric wire feature maps with different resolutions at a pre-set level respectively to obtain a characterization vector corresponding to each of the electric wire feature maps; and performing multi-level abstraction and feature extraction on the characterization vectors corresponding to the at least two electric wire feature maps with different resolutions via a Transformer block to obtain a first feature vector corresponding to each of the electric wire feature maps.

Alternatively, the performing image enhancement processing based on the at least two electric wire feature maps with different resolutions to obtain a second feature vector corresponding to each of the electric wire feature maps includes: performing image enhancement processing on the at least two electric wire feature maps with different resolutions via at least two electric wire sensing modules to obtain a second feature vector corresponding to the at least two electric wire feature maps with different resolutions; and extracting semantic information from low-resolution electric wire feature maps of the at least two electric wire feature maps with different resolutions through a semantic information extraction module to obtain a second feature vector corresponding to the low-resolution electric wire feature map.

Alternatively, the performing image enhancement processing on the at least two electric wire feature maps with different resolutions via at least two electric wire sensing modules specifically includes performing electric wire feature extraction on the electric wire feature map through two paths of asymmetric dilated convolutions of the electric wire sensing modules, where the at least two electric wire sensing modules each respectively include the two paths of asymmetric dilated convolutions, and the number of the at least two electric wire sensing modules keeps corresponding to the number of classes of the resolution.

Alternatively, the method further includes: acquiring the electric wire detecting network model, the acquiring the electric wire detecting network model includes: constructing an initial model of an electric wire detecting network; sampling an electric wire image and pre-processing the electric wire image to obtain pre-processed sample data; inputting the sample data into the initial model of the electric wire detecting network, and outputting the identification result of the corresponding electric wire; constructing a loss function based on the identification result of the electric wire; and optimizing to train an initial model of the electric wire detecting network according to the loss function to obtain model parameters corresponding to minimizing the loss function, and determining a final electric wire detecting network model according to the model parameters.

Alternatively, the constructing an initial model of an electric wire detecting network includes:

- designing a plurality of feature extraction modules based on a U-shaped neural network, where the plurality of feature extraction modules are arranged as a symmetric encoder and a decoder, and the encoder is used for processing at least two electric wire feature maps with different resolutions;
- inserting a channel adjustment module based on the U-shaped neural network, where the channel adjustment module is symmetrically designed based on the U-shaped neural network, and is used for performing size adjustment and channel number adjustment on the feature map processed by the encoder and the decoder;
- inserting an electric wire sensing module and a semantic information extraction module based on the U-shaped neural network, where the number of the electric wire sensing module and the semantic information extraction module keeps corresponding to the number of the encoder and the number of the decoder, the electric wire sensing module is used for performing image enhancement processing on the at least two electric wire feature maps with different resolutions to obtain a second feature vector corresponding to each of the electric wire feature maps, and the semantic information extraction module is used for performing semantic information extraction on a low-resolution electric wire feature map of the at least two electric wire feature maps with different resolutions; and
- inserting a Transformer block based on the U-shaped neural network, and the output results of the encoder and the channel adjustment module are both input into the Transformer block; the Transformer block is used for performing multi-level abstraction and feature extraction based on the at least two electric wire feature maps with different resolutions to obtain a first feature vector corresponding to each of the electric wire feature maps; and the decoder is used for performing feature fusion processing on the first feature vector and the second feature vector to obtain detection results of an electric wire image with different resolutions.

Alternatively, the constructing a loss function based on the identification result of the electric wire includes: constructing a loss function corresponding to the formula, and the formula is:

$$L=\alpha * CE_{weight=1:5}+\beta * phiLoss+\gamma * DiceLoss_{weight=1:5};$$

where L represents the loss function, α, β and γ are weight coefficients, CE refers to a cross entropy loss function, phiLoss refers to a loss function used for a target detection task, DiceLoss refers to a loss function used for an image segmentation task, and weight=1:5 refers to a weight ratio.

The embodiment of the present disclosure provides an electric wire detecting method, proposes an aviation data electric wire detecting segmentation algorithm of Heavy Token Encoding (HTE) Transformer architecture, proposes an electric wire sensing module for the nature of being long and thin of the electric wire, and an improved Share SCSE Block, and proposes a joint multi-weight loss function for optimizing electric wire segmentation to train the electric wire detecting network model. Thus, the ability of electric wire detection is enhanced, the accuracy of electric wire detection is improved, more advanced performance of electric wire segmentation can be realized, and the problem of electric wire detection in the industry is solved.

Figure 11:
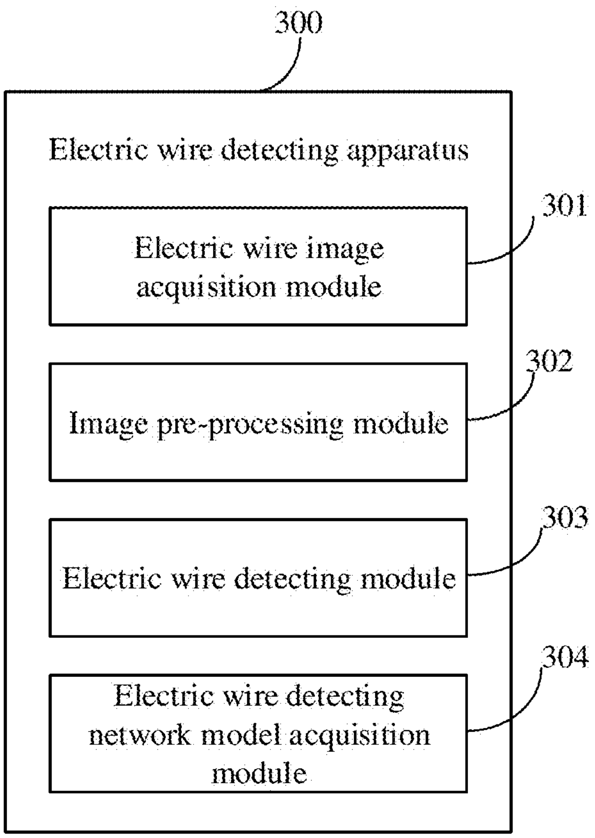
FIG. 11 is a schematic structural diagram showing an electric wire detecting apparatus according to an embodiment of the present disclosure.

Reference is made to FIG. 11, which is a schematic structural diagram showing an electric wire detecting apparatus according to an embodiment of the present disclosure. As shown in FIG. 11, the electric wire detecting apparatus 300 includes:

- an electric wire image acquisition module 301 configured to acquire an electric wire image;
- an image pre-processing module 302 configured to pre-process the electric wire image, and acquire at least two electric wire feature maps with different resolutions according to the pre-processed electric wire image; and
- an electric wire detecting module 303 configured to input the at least two electric wire feature maps with different resolutions into a pre-set electric wire detecting network model, and output an electric wire detecting result according to the electric wire detecting network model.

In some embodiments, an electric wire detecting network model acquisition module 304 is further included and is specifically configured to construct an initial model of an electric wire detecting network; sample an electric wire image and pre-processing the electric wire image to obtain pre-processed sample data; input the sample data into the initial model of the electric wire detecting network, and output the identification result of the electric wire; construct a loss function based on the identification result of the electric wire; and optimize to train an initial model of the electric wire detecting network according to the loss function to obtain model parameters corresponding to minimizing the loss function, and determine a final electric wire detecting network model according to the model parameters.

It is to be noted that the above-mentioned electric wire detecting apparatus 300 can execute the electric wire detecting method according to an embodiment of the present disclosure, and has functional modules and advantageous effects corresponding to the execution method. Technical details not described in detail in the embodiment of the electric wire detecting apparatus 300 can be referred to the electric wire detecting method provided in an embodiment of the present disclosure.

Figure 12:
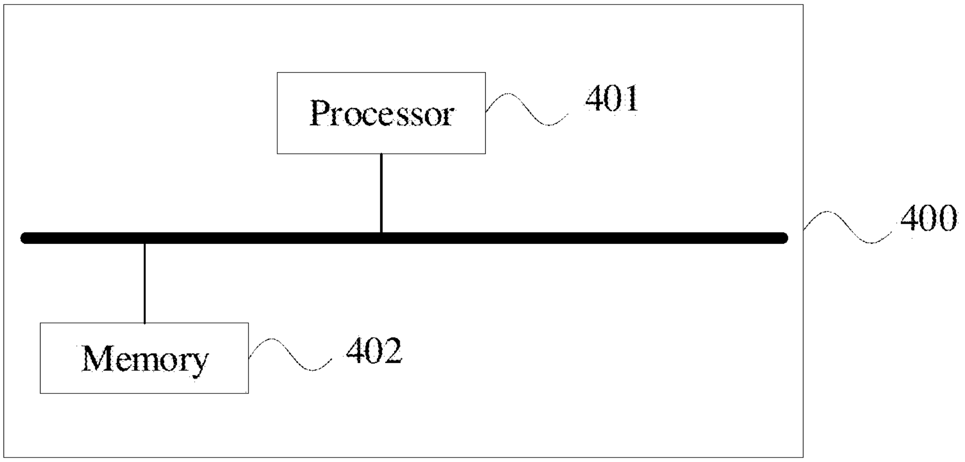
FIG. 12 is a schematic structural diagram showing a hardware of an electric wire detecting device 400 for performing an electric wire detecting method according to an embodiment of the present disclosure.

Reference is made to FIG. 12, which is a schematic structural diagram showing a hardware of an electric wire detecting device 400 for performing an electric wire detecting method according to an embodiment of the present disclosure. As shown in FIG. 12, the electric wire detecting device 400 includes: one or more processors 401 and memory 402, one processor 401 being exemplified in FIG. 12.

The processors 401 and the memory 402 may be connected via a bus or in other ways, and via a bus connection exemplified in FIG. 12.

The memory 402 serves as a non-transitory computer-readable storage medium for storing a non-volatile software program, a non-volatile computer-executable program, and modules such as program instructions/modules corresponding to the electric wire detecting method in an embodiment of the present disclosure. The processor 401 executes various functional disclosures of the server and data processing by running non-volatile software programs, instructions and modules stored in the memory 402, i.e., implements the above-described method embodiment electric wire detecting method.

The memory 402 may include a storage program area and a storage data area, where the storage program area may store an operating system and an disclosure program required for at least one function; the storage data area may store data, etc created according to the use of the electric wire detecting apparatus. Moreover, the memory 402 may include high-speed random-access memory, and may also include non-volatile memory, such as at least one magnetic disk storage device, flash memory device, or other non-volatile solid state storage device. In some embodiments, the memory 402 may optionally include memory remotely located relative to the processor 401, which may be connected to the electric wire detecting apparatus via a network. Embodiments of such networks include, but are not limited to, the Internet, Intranets, local area networks, mobile communication networks, and combinations thereof.

The one or more modules are stored in the memory 402, when executed by the one or more processors 401, perform the electric wire detecting method for any of the method embodiments described above.

The above-mentioned product can execute the groove depth measurement method provided by an embodiment of the present disclosure, and has functional modules and advantageous effects corresponding to the execution method. For technical details that are not described in detail in this embodiment, reference may be made to the method provided by an embodiment of the present disclosure.

The electric wire detecting device of embodiments of the present disclosure exists in a variety of forms including, but not limited to: unmanned aerial vehicle, smart phone, personal computer, server and other electronic apparatuses with data interaction function.

Embodiments of the present disclosure provide a non-volatile computer-readable storage medium having stored thereon computer-executable instructions that, when executed by one or more processors, such as processor 401 in FIG. 12, may cause the one or more processors to perform the electric wire detecting method in any of the method embodiments described above.

Embodiments of the present disclosure provide a computer program product including a computer program stored on a non-volatile computer-readable storage medium, the computer program including program instructions which, when executed by the electric wire detecting device, enable the electric wire detecting device to perform the electric wire detecting method for any of the method embodiments described above.

The above-described embodiments of the apparatus are merely illustrative, and the units described as separate parts may or may not be physically separate, and parts displayed as units may or may not be physical units, may be in one position, or may be distributed on multiple network units. Some or all the modules may be selected according to actual needs to achieve the purpose of the solution of the present embodiment.

Through the above description of the embodiments, it is obvious to a person skilled in the art that the embodiments may be implemented by means of software plus a general hardware platform, and may also be implemented by hardware. A person skilled in the art will appreciate that all or part of the processes in the methods of the embodiments described above can be implemented by hardware related to instructions of a computer program, and the computer program can be stored in a computer readable storage medium, and when executed, the computer program can include the processes of the embodiments of the methods described above. The storage medium may be a magnetic disk, an optical disk, a Read-Only Memory (ROM) or a Random Access Memory (RAM), etc.

Different from the case of the related art, the embodiments of the present disclosure provide an electric wire detecting method, apparatus, and device. The method includes acquiring an electric wire image, pre-processing the electric wire image, acquiring at least two electric wire feature maps with different resolutions according to the pre-processed electric wire image, inputting the at least two electric wire feature maps with different resolutions into a pre-set electric wire detecting network mode, and outputting the electric wire detecting result according to the electric wire detecting network model. Embodiments of the present disclosure can detect electric wires based on electric wire feature maps with different resolutions and the pre-set electric wire detecting network model, so that electric wires can be accurately detected.

Finally, it should be noted that: the above examples are only intended to illustrate the technical solution of the present disclosure, and not to limit it; within the idea of the disclosure, also technical features in the above embodiments or in different embodiments may be combined, steps may be implemented in any order, and there are many other variations of the different aspects of the disclosure as described above, which are not provided in detail for the sake of brevity; although the present disclosure has been described in detail with reference to the foregoing embodiments, it should be understood by a person skilled in the art that: the technical solutions described in the foregoing embodiments may still be modified, or some technical features may be equivalently replaced; and these modifications or substitutions do not depart from the spirit of the corresponding technical solutions of the embodiments of the present disclosure.

What is claimed is:

1. An electric wire detecting method, comprising
acquiring an electric wire image;
pre-processing the electric wire image, and acquiring at least two electric wire feature maps with different resolutions according to the pre-processed electric wire image; and
inputting the at least two electric wire feature maps with different resolutions into a pre-set electric wire detecting network model, and outputting an electric wire detecting result according to the electric wire detecting network model, wherein the inputting the at least two electric wire feature maps with different resolutions into a pre-set electric wire detecting network model, and outputting an electric wire detecting result according to the electric wire detecting network model comprises:
performing multi-level abstraction and feature extraction based on the at least two electric wire feature maps with different resolutions to obtain a first feature vector corresponding to each of the electric wire feature maps.

2. The method according to claim 1, wherein the inputting the at least two electric wire feature maps with different resolutions into a pre-set electric wire detecting network model, and outputting an electric wire detecting result according to the electric wire detecting network model further comprises:
performing image enhancement processing based on the at least two electric wire feature maps with different resolutions to obtain a second feature vector corresponding to each of the electric wire feature maps;
performing feature fusion processing on the first feature vector and the second feature vector to obtain detection results of an electric wire image with different resolutions; and
combining the detection results of the electric wire image with different resolutions to output an image comprising the original resolution of the electric wire.

3. The method according to claim 2, wherein the acquiring at least two electric wire feature maps with different resolutions according to the pre-processed electric wire image comprises:
extracting local features of the pre-processed electric wire image to obtain a local feature map;
down-sampling based on the local feature map; and
normalizing the down-sampled local feature map, and outputting a plurality of electric wire feature maps with different resolutions.

4. The method according to claim 2, wherein the performing multi-level abstraction and feature extraction based on the at least two electric wire feature maps with different resolutions to obtain a first feature vector corresponding to each of the electric wire feature maps comprises:
performing, by a feature extraction module, a down-sampling operation and an up-sampling operation on the at least two electric wire feature maps with different resolutions at a pre-set level respectively to obtain a characterization vector corresponding to each of the electric wire feature maps; and
performing multi-level abstraction and feature extraction on the characterization vectors corresponding to the at least two electric wire feature maps with different resolutions via a Transformer block to obtain a first feature vector corresponding to each of the electric wire feature maps.

5. The method according to claim 2, wherein the performing image enhancement processing based on the at least two electric wire feature maps with different resolutions to obtain a second feature vector corresponding to each of the electric wire feature maps comprises:
performing image enhancement processing on the at least two electric wire feature maps with different resolutions via at least two electric wire sensing modules to obtain a second feature vector corresponding to the at least two electric wire feature maps with different resolutions; and
extracting semantic information from low-resolution electric wire feature maps of the at least two electric wire feature maps with different resolutions through a semantic information extraction module to obtain a second feature vector corresponding to the low-resolution electric wire feature map.

6. The method according to claim 5, wherein the performing image enhancement processing on the at least two electric wire feature maps with different resolutions via at least two electric wire sensing modules specifically comprises:
performing electric wire feature extraction on the electric wire feature map through two paths of asymmetric dilated convolutions of the electric wire sensing modules, wherein the at least two electric wire sensing modules each respectively comprises the two paths of asymmetric dilated convolutions, and the number of the at least two electric wire sensing modules keeps corresponding to the number of classes of the resolution.

7. The method according to claim 1, the method is further comprising:
acquiring the electric wire detecting network model,
the acquiring the electric wire detecting network model comprises:
constructing an initial model of an electric wire detecting network;
sampling an electric wire image and pre-processing the electric wire image to obtain pre-processed sample data;
inputting the sample data into the initial model of the electric wire detecting network, and outputting the identification result of the corresponding electric wire;
constructing a loss function based on the identification result of the electric wire; and
optimizing to train an initial model of the electric wire detecting network according to the loss function to obtain model parameters corresponding to minimizing the loss function, and determining a final electric wire detecting network model according to the model parameters.

8. The method according to claim 7, wherein the constructing an initial model of an electric wire detecting network comprises:
designing a plurality of feature extraction modules based on a U-shaped neural network, wherein the plurality of feature extraction modules are arranged as a symmetric encoder and a decoder, and the encoder is used for processing at least two electric wire feature maps with different resolutions;

inserting a channel adjustment module based on the U-shaped neural network, wherein the channel adjustment module is symmetrically designed based on the U-shaped neural network, and is used for performing size adjustment and channel number adjustment on the feature map processed by the encoder and the decoder;

inserting an electric wire sensing module and a semantic information extraction module based on the U-shaped neural network, wherein the number of the electric wire sensing module and the semantic information extraction module keeps corresponding to the number of the encoder and the number of the decoder, the electric wire sensing module is used for performing image enhancement processing on the at least two electric wire feature maps with different resolutions to obtain a second feature vector corresponding to each of the electric wire feature maps, and the semantic information extraction module is used for performing semantic information extraction on a low-resolution electric wire feature map of the at least two electric wire feature maps with different resolutions; and inserting a Transformer block based on the U-shaped neural network, and the output results of the encoder and the channel adjustment module are both input into the Transformer block; the Transformer block is used for performing multi-level abstraction and feature extraction based on the at least two electric wire feature maps with different resolutions to obtain a first feature vector corresponding to each of the electric wire feature maps; and the decoder is used for performing feature fusion processing on the first feature vector and the second feature vector to obtain detection results of an electric wire image with different resolutions.

9. The method according to claim 7, wherein the constructing the loss function based on the identification result of the electric wire comprises:

constructing a loss function corresponding to the formula, and the formula is:

$$L = \alpha * CE_{weight=1:5} + \beta * phiLoss + \gamma * DiceLoss_{weight=1:5};$$

wherein L represents the loss function, α, β and γ are weight coefficients, CE refers to a cross entropy loss function, phiLoss refers to a loss function used for a target detection task, DiceLoss refers to a loss function used for an image segmentation task, and weight=1:5 refers to a weight ratio.

10. An electric wire detecting apparatus, comprising an electric wire image acquisition module configured to acquire an electric wire image;

an image pre-processing module configured to pre-process the electric wire image, and acquire at least two electric wire feature maps with different resolutions according to the pre-processed electric wire image; and an electric wire detecting module configured to input the at least two electric wire feature maps with different resolutions into a pre-set electric wire detecting network model, and output an electric wire detecting result according to the electric wire detecting network model, wherein the electric wire detecting module configured to perform multi-level abstraction and feature extraction based on the at least two electric wire feature maps with different resolutions to obtain a first feature vector corresponding to each of the electric wire feature maps.

11. The electric wire detecting apparatus according to claim 10, wherein the electric wire detecting apparatus is further configured to:

performing image enhancement processing based on the at least two electric wire feature maps with different resolutions to obtain a second feature vector corresponding to each of the electric wire feature maps;

performing feature fusion processing on the first feature vector and the second feature vector to obtain detection results of an electric wire image with different resolutions; and combining the detection results of the electric wire image with different resolutions to output an image comprising the original resolution of the electric wire.

12. The electric wire detecting apparatus according to claim 10, wherein the electric wire detecting apparatus is further configured to:

extract local features of the pre-processed electric wire image to obtain a local feature map;

down-sample based on the local feature map; and normalize the down-sampled local feature map, and outputting a plurality of electric wire feature maps with different resolutions.

13. The electric wire detecting apparatus according to claim 11, wherein the electric wire detecting apparatus is further configured to:

perform, by a feature extraction module, a down-sampling operation and an up-sampling operation on the at least two electric wire feature maps with different resolutions at a pre-set level respectively to obtain a characterization vector corresponding to each of the electric wire feature maps; and perform multi-level abstraction and feature extraction on the characterization vectors corresponding to the at least two electric wire feature maps with different resolutions via a Transformer block to obtain a first feature vector corresponding to each of the electric wire feature maps.

14. The electric wire detecting apparatus according to claim 11, wherein the electric wire detecting apparatus is further configured to:

perform image enhancement processing on the at least two electric wire feature aps with different resolutions via at least two electric wire sensing modules to obtain a second feature vector corresponding to the at least two electric wire feature maps with different resolutions; and extract semantic information from low-resolution electric wire feature maps of the at least two electric wire feature maps with different resolutions through a semantic information extraction module to obtain a second feature vector corresponding to the low-resolution electric wire feature map.

15. The electric wire detecting apparatus according to claim 14, wherein the electric wire detecting apparatus is further configured to:

perform electric wire feature extraction on the electric wire feature map through two paths of asymmetric dilated convolutions of the electric wire sensing modules, wherein the at least two electric wire sensing modules each respectively comprises the two paths of asymmetric dilated convolutions, and the number of the at least two electric wire sensing modules keeps corresponding to the number of classes of the resolution.

16. The electric wire detecting apparatus according to claim 14, wherein the electric wire detecting apparatus is further configured to:

acquire the electric wire detecting network model, the acquire the electric wire detecting network model comprises:

construct an initial model of an electric wire detecting network;

sample an electric wire image and pre-process the electric wire image to obtain pre-processed sample data;

input the sample data into the initial model of the electric wire detecting network, and output the identification result of the corresponding electric wire;

construct a loss function based on the identification result of the electric wire; and optimize to train an initial model of the electric wire detecting network according to the loss function to obtain model parameters corresponding to minimize the loss function, and determine a final electric wire detecting network model according to the model parameters.

17. The electric wire detecting apparatus according to claim 16, wherein the electric wire detecting apparatus is further configured to:

design a plurality of feature extraction modules based on a U-shaped neural network, wherein the plurality of feature extraction modules are arranged as a symmetric encoder and a decoder, and the encoder is configured to process at least two electric wire feature maps with different resolutions;

insert a channel adjustment module based on the U-shaped neural network, wherein the channel adjustment module is symmetrically designed based on the U-shaped neural network, and is configured to perform size adjustment and channel number adjustment on the feature map processed by the encoder and the decoder;

insert an electric wire sensing module and a semantic information extraction module based on the U-shaped neural network, wherein the number of the electric wire sensing module and the semantic information extraction module keeps corresponding to the number of the encoder and the number of the decoder, the electric wire sensing module is configured to perform image enhancement processing on the at least two electric wire feature maps with different resolutions to obtain a second feature vector corresponding to each of the electric wire feature maps, and the semantic information extraction module is configured to perform semantic information extraction on a low-resolution electric wire feature map of the at least two electric wire feature maps with different resolutions; and insert a transformer block based on the U-shaped neural network, and the output results of the encoder and the channel adjustment module are both input into the transformer block; the transformer block is configured to perform multi-level abstraction and feature extraction based on the at least two electric wire feature maps with different resolutions to obtain a first feature vector corresponding to each of the electric wire feature maps; and the decoder is configured to perform feature fusion processing on the first feature vector and the second feature vector to obtain detection results of an electric wire image with different resolutions.

18. The electric wire detecting apparatus according to claim 16, wherein the electric wire detecting apparatus is further configured to:

construct a loss function corresponding to the formula, and the formula is:

$$L = \alpha * CE_{weight=1:5} + \beta * phiLoss + \gamma * DiceLoss_{weight=1:5};$$

wherein L represents the loss function, α, β and γ are weight coefficients, CE refers to a cross entropy loss function, phiLoss refers to a loss function used for a target detection task, DiceLoss refers to a loss function used for an image segmentation task, and weight=1:5 refers to a weight ratio.

19. An electric wire detecting device, comprising at least one processor; a memory in communication connection with the at least one processor; wherein the memory storing instructions executable by the at least one processor, and the instructions are executable by the at least one processor to enable the at least one processor to perform an electric wire detecting method, wherein the electric wire detecting method comprising:

acquiring an electric wire image;

pre-processing the electric wire image, and acquiring at least two electric wire feature maps with different resolutions according to the pre-processed electric wire image; and inputting the at least two electric wire feature maps with different resolutions into a pre-set electric wire detecting network model, and outputting an electric wire detecting result according to the electric wire detecting network model, wherein the inputting the at least two electric wire feature maps with different resolutions into a pre-set electric wire detecting network model, and outputting an electric wire detecting result according to the electric wire detecting network model comprises:

performing multi-level abstraction and feature extraction based on the at least two electric wire feature maps with different resolutions to obtain a first feature vector corresponding to each of the electric wire feature maps.

20. The electric wire detecting device according to claim 19, wherein the inputting the at least two electric wire feature maps with different resolutions into a pre-set electric wire detecting network model, and outputting an electric wire detecting result according to the electric wire detecting network model further comprises:

performing image enhancement processing based on the at least two electric wire feature maps with different resolutions to obtain a second feature vector corresponding to each of the electric wire feature maps;

performing feature fusion processing on the first feature vector and the second feature vector to obtain detection results of an electric wire image with different resolutions; and combining the detection results of the electric wire image with different resolutions to output an image comprising the original resolution of the electric wire.

* * * * *